(12) United States Patent
Peters et al.

(10) Patent No.: US 7,944,436 B2
(45) Date of Patent: May 17, 2011

(54) PROTECTIVE LAYER FOR USE IN COMPUTING DEVICES WITH TOUCH-SENSITIVE SURFACES

(75) Inventors: David Peters, San Jose, CA (US); Felipe Misch, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1376 days.

(21) Appl. No.: 11/380,918

(22) Filed: Apr. 28, 2006

(65) Prior Publication Data

US 2007/0252819 A1 Nov. 1, 2007

(51) Int. Cl.
*G06F 3/045* (2006.01)
(52) U.S. Cl. .......................................... 345/174; 345/173
(58) Field of Classification Search .......... 345/173–179; 178/18.01–18.07, 19.01–19.06
See application file for complete search history.

(56) References Cited

U.S. PATENT DOCUMENTS 6,501,529 B1 * 12/2002 Kurihara et al. ............... 349/160
2004/0189587 A1 * 9/2004 Jung et al. ...................... 345/102

* cited by examiner

*Primary Examiner* — Vijay Shankar
(74) *Attorney, Agent, or Firm* — Mahamedi Paradice Kreisman LLP

(57) ABSTRACT

A computing device is disclosed comprising a touch-sensitive surface, a housing structure, and a protective layer. The touch-sensitive surface receives touch as input, and a housing structure has a tip segment that overlays the touch-sensitive surface. This tip segment of the housing structure is positioned to form a gap over the touch-sensitive surface. The protective layer is positioned to contact the tip segment of the housing structure and the touch-sensitive surface so as to form an obstruction in the gap against intrusions, such as debris buildup, for example.

8 Claims, 5 Drawing Sheets

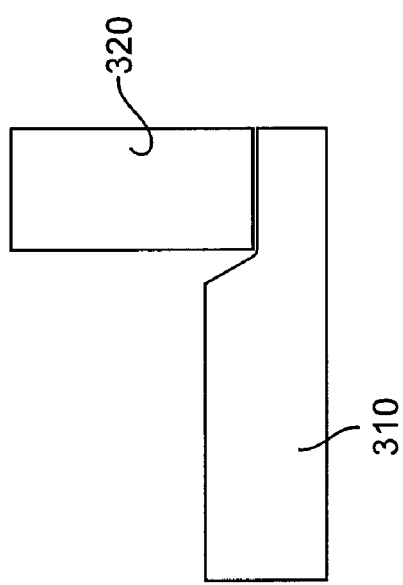
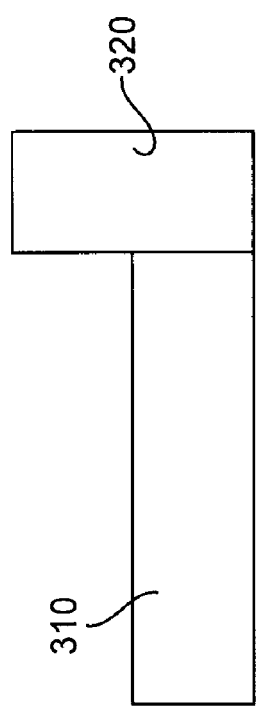
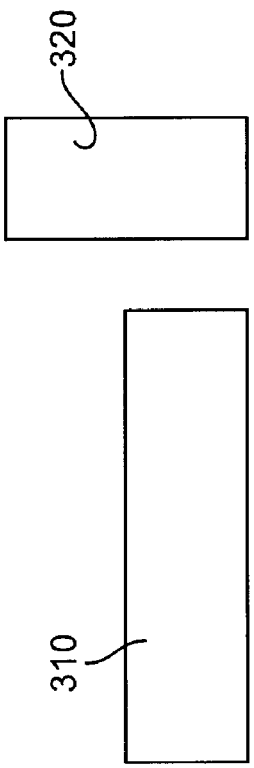
FIG. 3A
FIG. 3B
FIG. 3C

PROTECTIVE LAYER FOR USE IN COMPUTING DEVICES WITH TOUCH-SENSITIVE SURFACES

TECHNICAL FIELD

The disclosed embodiments relate to a protective layer for use in computing devices with touch-sensitive surfaces.

BACKGROUND

Portable computing devices, such as cell phones and personal digital assistants (PDAs), are subject to many forces and conditions that can cause the devices to break, or lose performance. The type of damage that can be inflicted on a computing device can from numerous sources. For example, devices can be dropped or shaken, causing exterior and interior damage. The displays of small computing devices are one of the more vulnerable components to sudden physical forces, particularly when such displays are touch-sensitive.

But ongoing environmental exposure can prematurely shorten the life of a computing device as well. In particular, debris can cause damage to various components of a computing device. Debris may come in the form of dust, particles, lint and other objects that cumulatively can affect performance of components of a computing device.

SUMMARY OF THE INVENTION

A computing device is described herein with a protective layer positioned between a housing and a touch-sensitive input device, such as a touch panel display screen. The protective layer guards against intrusions, such as debris buildup, in a gap or opening formed between the housing and the touch-sensitive surface. This protective layer is formed from a material that does not cause false input to be registered with the touch-sensitive surface.

BRIEF DESCRIPTION OF THE DRAWINGS

FIG. 3A-3C illustrates different implementations for how the low compression and high compression protective layers can be arranged to provide an integrated or combined protective layer, according to embodiments of the invention.

DETAILED DESCRIPTION

Figure 1:
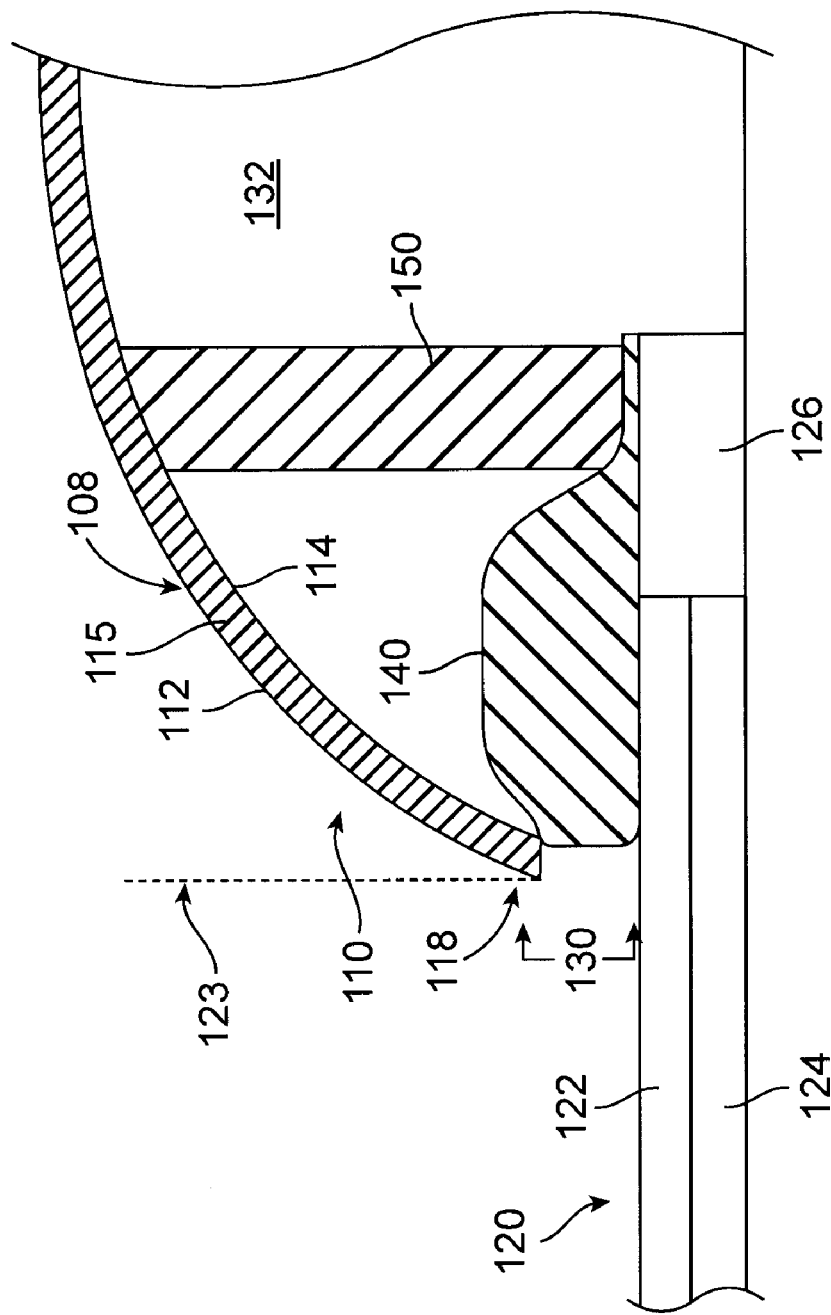
FIG. 1 is a simplified cross-sectional view of a computing device, illustrating a protective layer provided between a housing and a touch panel display surface, under one or more embodiments of the invention.

Embodiments described herein provide a protective layer between a housing and a touch-sensitive input device, such as a touch panel display screen. The protective layer guards against intrusions, such as debris buildup, in a gap or opening formed between the housing and the touch-sensitive surface. The protective layer is formed from a material that does not cause false input to be registered with the contact sensitive surface.

According to an embodiment, a computing device includes a touch-sensitive surface for receiving touch as input, and a housing structure having a tip segment that overlays the touch-sensitive surface. The tip segment forms a gap over the touch-sensitive surface. A first protective layer is positioned to contact the tip segment of the housing structure and the touch-sensitive surface so as to form an obstruction in the gap against intrusions.

As used herein, the term "characteristic compression force", or interchangeably "characteristic compressive force", means a minimum force needed to compress a given material.

In an another embodiment, a computing device is provided having a touch-sensitive display component, and a housing structure. The housing structure includes a tip segment that overlays the display component. The tip segment may form a gap over the display component, so that the housing structure defines an interior that is near the touch-sensitive display component. The computing device also includes a low compression gasket positioned to contact the tip segment of the housing structure and the touch-sensitive surface so as to form an obstruction in the gap against intrusions. Additionally, the computing device includes a high compression gasket positioned in the interior and dimensioned to provide resilient support to the housing structure.

According to another embodiment, an integrated protective layer is provided for a computing device. The integrated protective layer includes a first layer formed from a first material, and a void that is dimensioned to that a portion of the first layer can be positioned on a perimeter of an available display area of a touch-sensitive display component. The position of the first layer overlays the display component. The first layer is formed from a first material having a first characteristic compression force, and has a thickness that obstructs one or more gaps formed between a housing structure of the computing device and its touch-sensitive display component. The integrated protective layer further comprises a second layer formed on one or more regions of the first layer. The second layer is formed from a second material having a second characteristic compression force, and the second layer is positioned relative to the first layer so that when the housing structure of the computing device is placed over the integrated protective layer, the second layer is compressed by an interior surface of the housing structure. The characteristic compression force of the first material enables the first layer to deform over the touch-sensitive display component without causing an input to register with the touch-sensitive display component. The characteristic compression force of the second material enables the second layer to provide resilient support to the housing structure when compressed by the housing structure.

FIG. 1 is a simplified cross-sectional view of a computing device, illustrating a protective layer provided between a housing and a touch panel display surface, under one or more embodiments of the invention. A computing device 100 includes a housing structure 110 that has an exterior surface 112 and an interior surface 114. A sectional thickness 115 extends between the exterior surface 112 and the interior surface 114. The computing device includes a touch-sensitive display component 120 that is positioned adjacent to the housing structure 110. In one implementation, display component 120 includes a touchpad 122 that overlays a liquid crystal display 124. The touchpad 122 enables the touch-sensitive functionality of the display component 120.

At the area where the housing structure 110 meets the display component 120, a separation is provided to protect the display component 120 from the housing structure 110. At the same time, it is of interest to maximize the area of the display component 120. The result is that the touchpad 122 and the LCD 124 are extended slightly so that a tip segment 118 of the housing structure 110 overlays a small area of the touchpad 122 and LCD 124. Since the housing structure 110 does not directly touch the display component 120, a gap 130 is formed between the tip segment 118 of the housing structure 110 and the display component 120. In the absence of protection, debris and particles may lodge within the gap 130, and negatively impact the computing device 100 and the touch panel 122. In particular, debris and particles lodged in the gap 130 can press against the touchpad 122 to cause false inputs, thus negatively affecting the operation of the touchpad and impeding the user's ability to use the device.

In one embodiment, the housing structure 110 is shaped inward to form an inward formation 108. The inward formation 108 terminates in a tip segment 118, which provides the transition to the touch panel 122. In one implementation, tip segment 118 orients the sectional thickness 115 at least acutely towards the touchpad 122. Thus, in an embodiment shown by FIG. 1, the gap 130 extends at least in part between the sectional thickness 115 of the tip segment 118 and the display component 120. On one side of the gap 130 is the available touch panel area 123. On the other side of the gap 130 is an interior space 132 of the device's housing. As mentioned, one or more embodiments contemplate touch panel 122 extending into the gap 130 and the interior space 132, so as to extend beyond the boundary of the available touch panel area 123.

For mobile computing devices and other small-form factor devices, gap 130 may be relatively small, such as of the order of less than 0.5 mm. While this dimension may be small, the dimension is sufficient to collect debris, which can then become in the gap 130 and trigger the touchpad 122. False inputs that result from debris can severely hinder use of the computing device 100. While debris buildup is an issue, it is also beneficial in many cases to maintain the overlay of the housing structure 110 over the display component 120, so that the touch panel 122 extends into the gap 130. Such a design maximizes display size, while facilitating assembly of the computing device 100.

According to one or more embodiments, a protective layer is provided within the gap 130 to protect the device from accumulation of debris, particles and other lateral intrusions in the gap 130. In an embodiment, the protective layer is in the form of a gasket 140. The material that forms the gasket 140 has properties that prevent the gasket 140 from triggering input on the area of the touchpad that it overlays. In particular, the gasket 140 is formed from ultra or very low compression material, sometimes alternatively characterized as "soft" or "slow rebound" material. In one embodiment, the material of the gasket 140 includes "open cell foam" or polyurethane mixtures.

In one embodiment, the gasket 140 is deformed by the tip segment 118 so that it is held in place within the gap 130. When held in place, the gasket 140 is in contact with touchpad 122 and the housing structure 110. Since the gasket 140 is in contact with touchpad 122, it has the potential to cause the touchpad 122 to register false positives. However, due to the low compression properties of the gasket 140, the gasket does not readily trigger input on the touchpad 122. In order to reduce the frequency of false readings on the touchpad 122, gasket 140 may be formed from a material that has a characteristic compressive force that is less than a minimum force that is detectable by the touchpad 122. For example, in one implementation, touchpad 122 is configured to detect contacts that provide a force greater than 2.45 N. In such an implementation, the gasket 140 is formed from a material that has a characteristic compression force of less than 2.45N, meaning that a force of less than 2.45 N can compresses the gasket 140, but is not detected by the touch panel 122.

Figure 2:
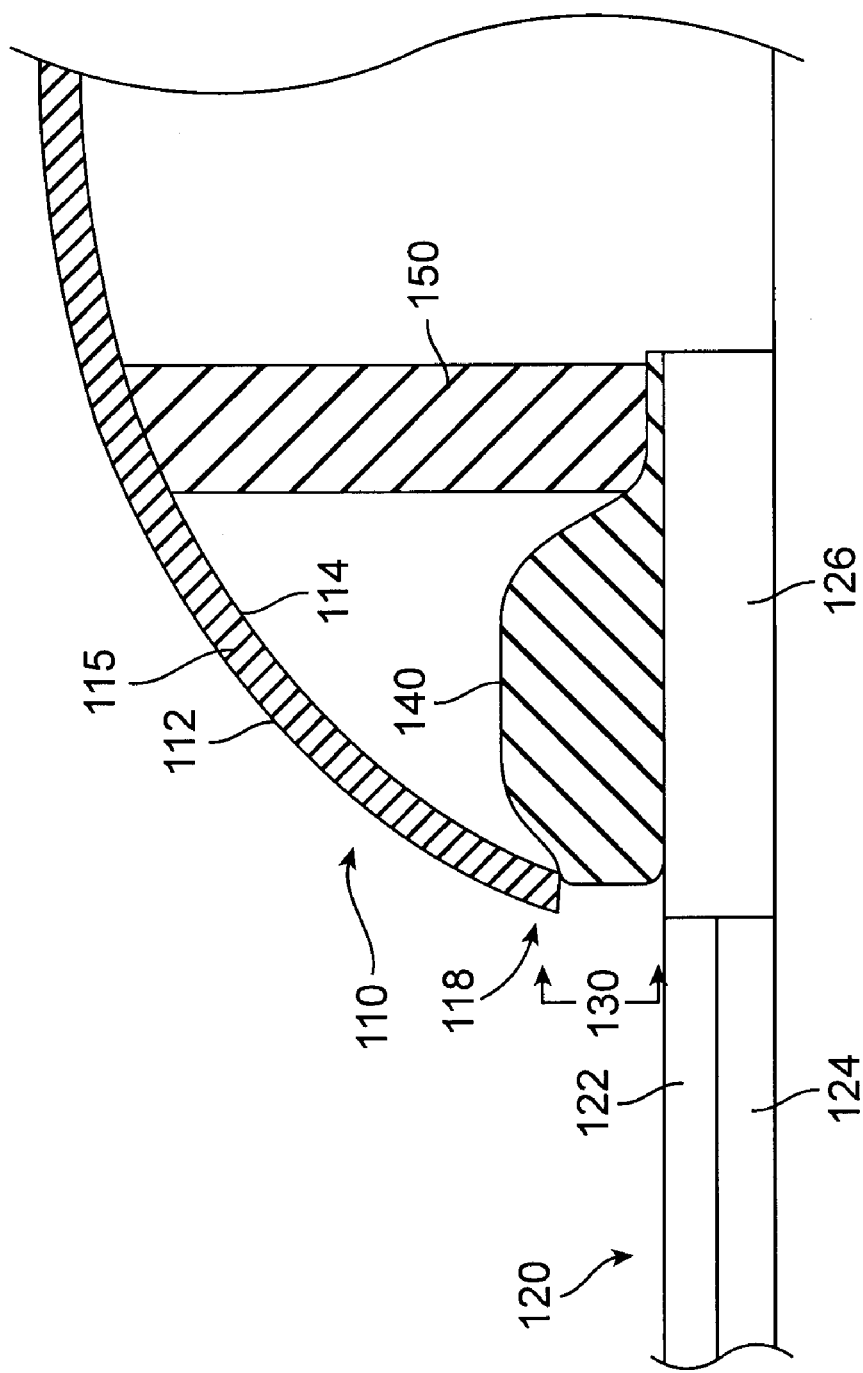
FIG. 2 illustrates an alternative embodiment for positioning a protective layer between a housing and a touch panel display surface.

In another embodiment, such as described with FIG. 2, gasket 140 may be formed from a material that has a characteristic compressive force that is of the order of the minimum force that is detectable by the touchpad 122, or even greater (greater by a magnitude of order of one or more). More resilient materials are also contemplated.

As described with one or more embodiments, the low compression nature of gasket 140 provides minimal resilient forces against the housing structure 110. As such, the first gasket 140 protects against lateral intrusions, such as debris buildup, while not being a cause of false inputs on the touch panel 122 through its compression within gap 130. In order to provide compressive protection, a second protective layer is provided in the form of a second gasket 150. The second gasket 150 is positioned to support the housing structure 110 from the interior. In one implementation, second gasket 150 is positioned to contact the interior surface 114 of the housing structure 110, to provide resilience that protects against impact forces, such as those that might jar the display component 120, or otherwise cause the housing structure 110 to damage the touch panel 122 or LCD 124. For example, the second gasket 150 supports the housing structure 110 against inward movement or flexing that can direct, for example, the tip segment 118 to contact the display panel 120. The second gasket 150 may be positioned away from the touchpad 122, as its resilient nature would cause false input on the touchpad 122.

In an embodiment, the first gasket 140 and second gasket 150 may form a combined or integrated protective layer or component. In particular, the first gasket 140 and second gasket 150 may in combination form a protective layer that (i) provides resilience against the housing structure 110 to guard the display component 120 against impact forces, and (ii) shields against debris and other lateral intrusions without triggering or registering input on the touchpad 122 of the display component 120. In one embodiment, the first gasket 140 is extended inward over an interior area underneath the housing structure 110, and the second gasket 150 is positioned on top of a portion of the first gasket 140. The second gasket 150 may be compressed at least slightly against the interior surface 114 of the housing structure, causing the first gasket 140 to compress at the region where it underlies the second gasket 150. The first gasket 140 may extend substantially uncompressed to the gap 130, where it is deformed against the tip segment 118 and held within gap 130. Given the low compression characteristics of the first gasket 140, the deformation of the first gasket 140 within gap 130 does not trigger touchpad 122. On the other hand, second gasket 150 provides resilience and support to the interior of the housing structure 110. The compression of the second gasket 150 at the interior surface 114, and the compression of the first gasket 140 at the tip segment, combine so that the first and second gaskets are pressed against each other and held in position within the housing structure 110. In this way, the first gasket 140 and the second gasket 150 form an integral multifaceted layer protective layer, guarding against both lateral intrusions and impact forces.

In addition or as an alternative, one or more embodiments contemplate the use of adhesives to adjoin the first gasket 140 to the second gasket 150, the first gasket 140 to either the tip segment 118 of the touch panel 122, and/or the second gasket 150 to the housing segment 110 or event to an interior of the device 100. As another alternative, the second gasket 150 may be separated from the first gasket 140. Numerous other variations and alternatives are also contemplated.

When positioned within the gap 130, the gasket 140 may be slightly biased or deformed, so as to stay in place. In one implementation, the gap 130 has a dimension of 0.3 mm as it extends from tip segment 118 to touch panel 112, with a tolerance of 0.1 mm. The gasket 140 may have a dimension of 0.5 mm, and a tolerance of 0.1 mm. In such an embodiment, at the high end of the tolerance, the first gasket 140 is compressed about 0.4 mm, so it can still plug gap 130, and at the low end of the tolerance, it is compressed about 0.0 mm. In either case, the first gasket 140 forms an obstruction in gap 130 against lateral intrusions. In one embodiment, gap 130 is plugged by the first gasket 140, but the nature of the first gasket 140 prevents the registering of false input on the touch panel 122. Numerous other dimensions are contemplated. For example, the first gasket may range in dimension between 0.125 mm and 0.5 mm.

According to one embodiment, gasket 140 is recessed inward within gap 130, so that it does not extend over the available touch panel area 123. The recessing of gasket 140 provides better overall aesthetics, while at the same time protecting the first gasket from damage. An embodiment of FIG. 1 illustrates a recessing of the first gasket 140 inward within the gap 130. As measured from the exterior surface 112 of the tip segment 118, the first gasket 140 may be recessed inward about 0.3 mm, with a tolerance of 0.1 mm.

FIG. 2 illustrates an alternative embodiment in which the touch panel 122 is moved away from both the first gasket 140 and the second gasket 150, so as to overlay an inactive portion 126 of the display component, or alternative internal structure. An embodiment such as shown with FIG. 2 dimensions the touch panel 122 to remain with the available display area 123, and to not extend into the gap 130. An embodiment such as shown with FIG. 2 permits less sensitive material to be used for the first gasket 140, as the first gasket 140 cannot directly cause input to be registered falsely onto the touchpad 122. Thus, it is possible for the more resilient material to be used for first gasket 140, particularly when, as shown with an embodiment of FIG. 2, the first gasket 140 does not overlay the touch panel 122. However, the proximity of the touch panel 122 to the gap 130 may be such that if the first gasket 140 is too resilient or has too high of a characteristic compressive force characteristic, the display component may flex and cause the occasional false input. Thus, an embodiment contemplates the first gasket 140 to have a low characteristic compressive force, albeit not necessarily less than the minimum force that is detectable by the touch panel 122. The second gasket 150 is still high compression material, so the compression characteristic forces of the first gasket 140 is less than the compression characteristic forces of the second gasket 150. With regard to either implementation of FIG. 1 or FIG. 2, embodiments contemplate a ratio of for the characteristic compression force of the second gasket 150 to be greater than the characteristic compression force of the first gasket 140 by a factor of ten or more (i.e. of at least an order more).

FIG. 3A-3C illustrates different implementations for how the low compression and high compression protective layers can be arranged to provide an integrated or combined protective layer, according to embodiments of the invention. FIG. 3A illustrates an embodiment such as shown with FIG. 1 and FIG. 2, in which a relatively low compression layer 310 (i.e. first gasket 140) extends an area A inward and underneath a relatively high compression layer 320 (i.e. second gasket 150). The high compression layer 320 may compress the low compression layer 310 as it presses against an interior of a housing and maintains its position. In doing so, the low and high compression layers 310, 320 both remain in place, at least at that end. In an embodiment such as shown by FIG. 3A, a suitable material is "very soft" open cell foam, formed from polyurethane. A particular type of material for use with the low compression layer 310 is PORON, such as manufactured, in the 4790-92 product series (available in a thickness of 0.125-0.5 mm), by the ROGERS CORPORATION. The high compression layer 320 may be formed from various materials, including polyurethane and open cell foams.

In an embodiment of FIG. 3B, the low compression layer 310 is positioned to adjoin but not underlie the high compression layer 320. In this way, the low compression layer 310 is not deformed underneath the high compression layer 320. The low and high compression layer 310, 320 may be maintained in position with, for example, the use of adhesives, either between the layers 310, 320 or between the layers and the device or housing.

In FIG. 3C, the low and high compression layers 310, 320 may be separated. Alternatives to high compression layer 320 are also possible. For example, with reference to FIG. 3C, a spring structure may supplement or substitute for the high compression layer 320.

FIG. 4A-4E illustrate an assembly technique for forming a combination protective layer formed from a low compression material and a high compression material, under an embodiment of the invention. In particular, the combination protective layer formed through a method such as described may be used to form the combination of the first gasket 140 and the second gasket 150, as shown with embodiments of FIG. 1. In describing a method of FIG. 4A-4E, reference to elements of FIG. 1 are made for descriptive purposes.

Figure 4A:
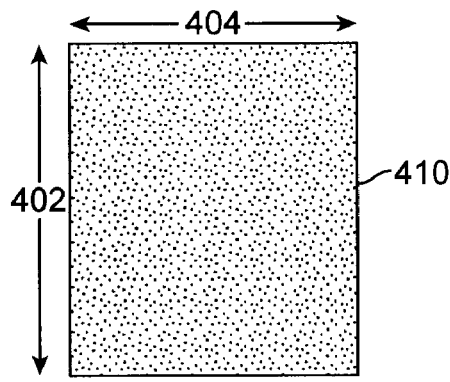
FIG. 4A-4E illustrate an assembly technique for forming a combination protective layer, under an embodiment of the invention.

In FIG. 4A, a preliminary step is shown in which a sheet 410 of low compression material is dimensioned for insertion within a housing structure of a computing device, such as described by FIG. 1 and FIG. 2. In an embodiment, the computing device is a mobile computing device, such as used to perform cellular telephony. Such devices have touch-sensitive displays provided on small form-factor housings. Accordingly, a length 402 and width 404 of the sheet may define the peripheral boundary that the low compression material is to occupy. With reference to FIG. 1, for example, the dimensions of the peripheral boundary may be applied to the first gasket 140.

Figure 4B:
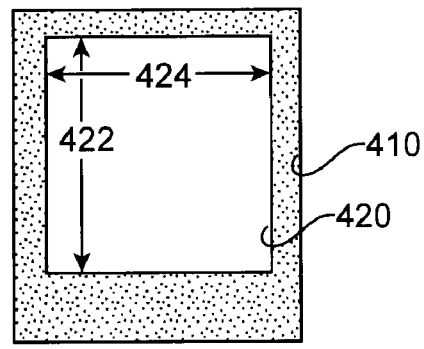

FIG. 4B illustrates that a cut-out or void 420 is formed in the sheet 410. The void 420 is to accommodate the display component 120, and more specifically, the available display area 123 of the display component. In addition, one embodiment provides that the void 420 accommodates the recessing the first gasket 140 underneath the housing structure 110. As such, one embodiment provides that the length 422 of the void 420 corresponds to a sum of the length of the available display area 123 and the amount of recess provided for the first gasket 140 in the widthwise direction of the available display area. Likewise, the width 424 of the void 120 corresponds to a sum of the width of the available display area 123 and the amount of recess provided for the first gasket 140 in the lengthwise direction of the available display area.

Figure 4C:
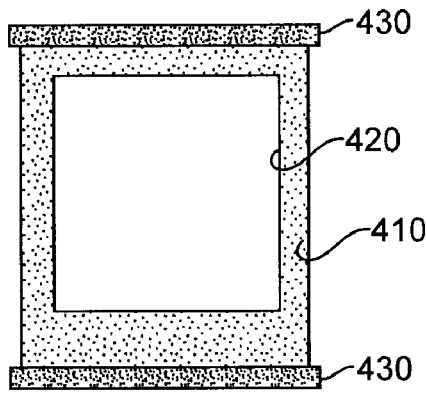

FIG. 4C provides that the sheet 410, with the void 420, is mounted to an interior structure 430 of the computing device, so that it will underlie the housing structure 410. For example, the sheet 410 may be mounted to a midframe.

Figure 4D:
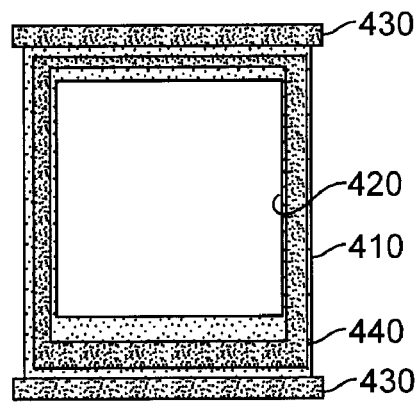

FIG. 4D provides that a material 440 corresponding to the second gasket 150 is overlaid on a perimeter or surrounding region of the material for the first gasket 140. An embodiment shown assumes that the material 440 is provided on top of the sheet 410, as shown with, for example, FIG. 3A, although other embodiments such as shown by FIG. 3B and FIG. 3C are also possible. The material 440 may be provided in segments, or as a continuous peripheral structure to the sheet 410. In the latter case, the material 440 may be shaped using steps such as illustrated by FIG. 4A-FIG. 4B. Thus, the material 440 may be provided from a sheet that is dimensioned, then cut-out to provide for a void that enables the second gasket 150 to be positioned sufficiently interior to support the housing and be clear of the touch pad 122.

Figure 4E:
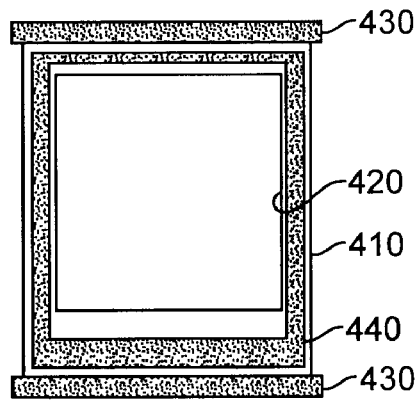
Figure 4E:
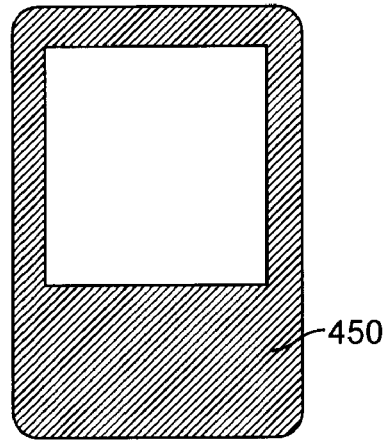

In FIG. 4E, a housing structure or shell 450 may be secured to the interior structure that is placed underneath the sheet 410. A resulting bias may be formed by the material 440 that maintains the material 440 (i.e. second gasket 150) and sheet 410 (i.e. first gasket 110) in place. Additional adhesives or other securement means may also be used.

Numerous variations, implementations and alternatives are contemplated to an assembly technique as described with FIG. 4A-FIG. 4E. Moreover, the overlaying deformable materials arrangement may also be varied, as described with, for example, FIG. 3B and FIG. 3C.

Figure 5A:
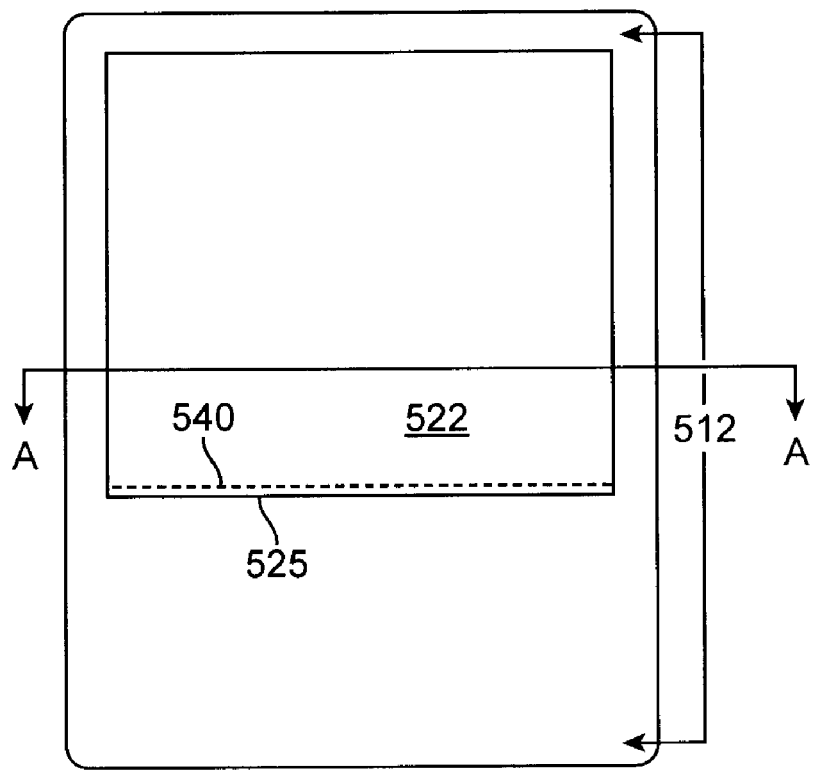
FIG. 5A and FIG. 5B illustrate a computing device on which a low compression material may be implemented, under one or more embodiments of the invention.
Figure 5B:
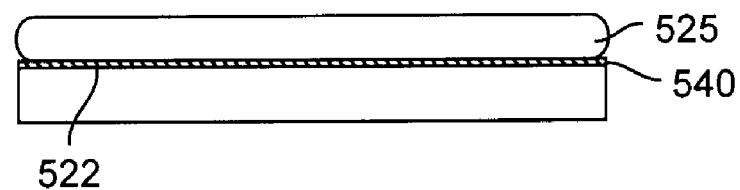

FIG. 5A and FIG. 5B illustrate a computing device 500 on which a low compression material may be implemented, under one or more embodiments of the invention. In FIG. 5A, a top view is provided of a computing device 500 having a touch-sensitive display component 520. A housing shell 510 may provide at least part of a front face 512 of the computing device 500. The front face 512 may also include the display area 522 of the display component 520, as well as numerous buttons (not shown) and other features.

Under one implementation, the housing shell 510 transitions into the display area 522 through use of an inward housing feature, such as an indentation 525. The indentation 525 may form a perimeter or boundary of the display area 522. A protective gasket 540 (shown in phantom) may line a spacing just underneath the indentation 525. As described with an embodiment of FIG. 1, the protective gasket 540 may be formed from the combination of the first gasket 140 and the second gasket 150. The first gasket 140 is provided just underneath the indentation 525, recessed slightly inward from the display area 522. Under one implementation, a distance of the inward recess may be about 0.3 mm, with a tolerance of 0.1 mm. The second gasket 150 may be provided further away from the display area 522, but may still be provided under the indentation 525.

FIG. 5B illustrates a sectional view of the computing device where the indentation 525 meets the display surface 522, along lines A-A, under an embodiment. A gap separation between the indentation 525 and the display area 522 is sealed, or at least filled, by protective material 540 (i.e. first gasket 140). The material 540 protects from debris collection and lateral insertion, but at the same time, the protective material is sufficiently low in compression to prevent false inputs from being received on the display area 522.

Furthermore, while embodiments described above are provided in a context of a touch-sensitive display component, one or more embodiments contemplate use on a touchpad or touch-sensitive mouse pad.

Although illustrative embodiments of the invention have been described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. This, the absence of describing combinations should not preclude the inventor from claiming rights to such combinations.

What is claimed is:

1. An integrated protective layer for a computing device, the integrated protective layer comprising:
    a first layer formed from a first material, wherein the first layer includes a void that is dimensioned to that a portion of the first layer positioned on a perimeter of an available display area of a touch-sensitive display component on the computing device so as to overlay the touch-sensitive display component, and wherein the first layer is formed from a first material having a first characteristic compression force, wherein the first layer has a thickness that obstructs one or more gaps formed between a housing structure of the computing device and the touch-sensitive display component of the computing device; and
    a second layer formed on one or more regions of the first layer, wherein the second layer is formed from a second material having a second characteristic compression force, wherein the second layer is positioned relative to the first layer so that when the housing structure of the computing device is placed over the integrated protective layer, the second layer is compressed by an interior surface of the housing structure;
    and wherein the characteristic compression force of the first material enables the first layer to deform over the touch-sensitive display component without causing an input to register with the touch-sensitive display component; and
    wherein the characteristic compression force of the second material enables the second layer to provide resilient support to the housing structure when compressed by the housing structure.

2. The integrated protective layer of claim 1, wherein the first material is formed from open cell foam.

3. A computing device comprising:
    a touch-sensitive display component;
    a housing structure having a tip segment that overlays the display component, wherein the tip segment forms a gap over the display component, wherein the housing structure defines an interior of the housing structure that is near the touch-sensitive display component;
    a low compression gasket positioned to contact the tip segment of the housing structure and the touch-sensitive surface so as to form an obstruction in the gap against intrusions; and
    a high compression gasket positioned in the interior and dimensioned to provide resilient support to the housing structure.

4. The computing device of claim 3, wherein the low compression and high compression gasket form an integrated protective layer formed from two or more materials, wherein a characteristic compression force of a material of the low compression gasket is less than a minimum force needed to register input with the touch-sensitive display component, and wherein a characteristic compression force of a material of the high compression gasket is less greater than characteristic compression force of the material of the low compression gasket.

5. The computing device of claim 4, wherein the low compression gasket is formed from an open cell foam.

6. The computing device of claim 3, wherein the low compression gasket is recessed in the gap from an available region of the display component.

7. The computing device of claim 4, wherein the low compression gasket has a characteristic compression force that is of one or more orders of magnitude greater than a characteristic compression force of the high compression gasket.

8. The computing device of claim 3, wherein the high compression gasket is at least partially overlaid on a section of the low compression gasket that extends away from touch-sensitive surface.

* * * * *